Figure 1:
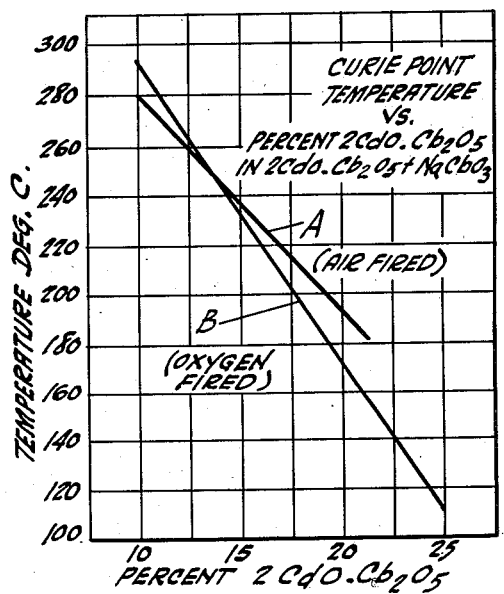

Feb. 5, 1952  S. BOUSKY  2,584,324
CERAMIC DIELECTRIC MATERIALS AND METHOD OF MAKING
Filed Dec. 30, 1950

INVENTOR
SAMUEL BOUSKY
BY
ATTORNEY

Patented Feb. 5, 1952

2,584,324

UNITED STATES PATENT OFFICE 2,584,324

CERAMIC DIELECTRIC MATERIALS AND METHOD OF MAKING

Samuel Bousky, Dayton, Ohio, assignor, by mesne assignments, to Radio Corporation of America, a corporation of Delaware Application December 30, 1950, Serial No. 203,605

15 Claims. (Cl. 106—39)

This invention relates to novel ceramic materials having desirable dielectric and other properties. The invention also relates to methods of making the novel materials.

Vitreous ceramic dielectric materials comprising columbates or tantalates of the alkali and alkaline earth metals have been described in a copending application of Eugene Wainer, Serial No. 159,094, filed April 29, 1950. These ceramics have been found to be good insulators with high resistivities and low power factors. They also exhibit piezoelectric effects. Their dielectric constants vary from values as high as about 300 at room temperature to 2,000 or more at their Curie temperatures of around 400° F.

Vitreous ceramic dielectric materials comprising zinc or cadmium columbates or tantalates have been described in another copending application of Eugene Wainer, Serial No. 176,253, filed July 27, 1950, now abandoned. These materials are characterized by having fairly high dielectric constants at room temperatures. They also exhibit piezoelectric and ferroelectric properties.

The novel materials of the present invention comprise vitreous ceramic materials which may be described as combinations of alkali metal columbates and either zinc or cadmium columbates. It has been found, for example, that when increasing proportions of cadmium columbate ($2CdO \cdot Cb_2O_5$) are combined with sodium columbate, materials are obtained having greatly improved electrical properties, including unusually high dielectric constants.

One object of the present invention is to provide novel ceramic materials having improved dielectric properties.

Another object of the invention is to provide improved dielectric materials with unusually broad ranges of Curie temperatures.

Another object of the invention is to provide improved dielectric materials of which the dielectric constant remains constant at a high level over broad temperature ranges.

Another object of the invention is to provide novel dielectric materials having excellent electrical properties at elevated temperatures.

Another object of the invention is to provide novel dielectric materials of which the dielectric constant is usefully high at temperatures as high as 300° C.

Still another object of the invention is to provide novel ceramic dielectric materials having an improved low value of electrical dissipation factor along with unusually high dielectric constants at room temperature.

Figure 2:
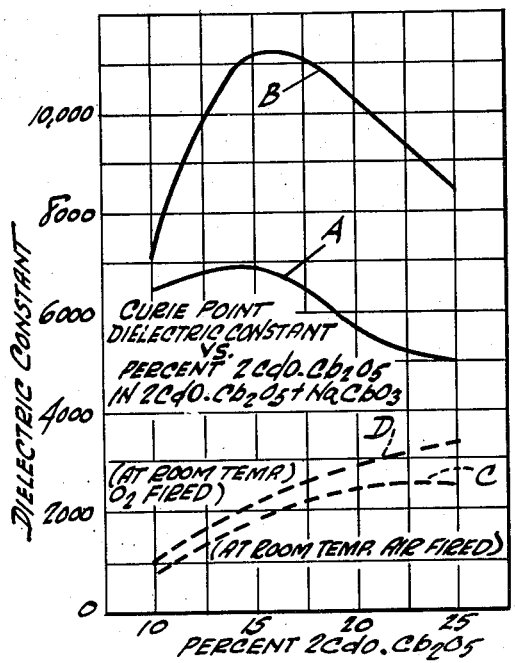

These and other objects will be more apparent and the invention will be more readily understood from a consideration of the following detailed description, including the drawings, of which:

Figure 1 is a graph showing how Curie point temperatures vary with composition in one embodiment of materials in accordance with the present invention, and Figure 2 is a graph showing a comparison between dielectric constants at the Curie point temperature and at room temperature for the materials referred to in Figure 1.

An example of preparation of a preferred embodiment of a material included in the present invention will now be given.

Example

A quantity of sodium columbate is prepared, for example, by the method described in copending application, Serial No. 159,094, previously referred to. As set forth in Example 1 of the copending application, sodium columbate may be prepared by mixing equimolar quantities of sodium carbonate and pure columbium pentoxide and calcining at about 1900° F. in an atmosphere of oxygen. An air atmosphere may also be used. Calcination time is usually about ½ to 2 hours.

A quantity of cadmium columbate is also prepared, as, for example, by the method described in the previously referred to copending application, Serial No. 176,253. As in Example 1 of this copending application, cadmium columbate may be prepared by mixing two moles of pure cadmium oxide and one mole of columbium oxide. The mixture is ground to an impalpable powder and calcined in air or oxygen at a temperature of about 2100° F. for about 20 to 45 minutes.

Quantities of each of the sodium and cadmium columbates, prepared as described above, are then mixed thoroughly and ground to an impalpable powder. A suitable quantity of a temporary binder such as polyvinyl alcohol or methyl cellulose may be added. The amount of temporary binder added is preferably from 8 to 10% by weight. When polyvinyl alcohol is used as the binder, it may be used in the form of an aqueous solution containing 12 to 14% by weight of the alcohol. Methyl cellulose may be used in the form of an aqueous solution containing about 2% of the methyl cellulose by weight. Other volatilizable binders may be used.

Bodies molded of the above mixture are fired in an oxygen-containing, oxidizing atmosphere, preferably composed of pure oxygen, at temperatures of about 2,200° to 2,400° F. to vitrification. Optimum firing time depends on particular composition used, firing temperature, atmosphere, size and shape of body, etc., but, in general, is from about 10 minutes to about 45 minutes. It is generally preferable, in order to obtain products with optimum dielectric properties, to fire at the lowest temperature and for the shortest time needed to develop complete maturation. The dielectric properties also may be improved by proper aging by either one of two methods. The first of these is to permit the vitrified product to stand for two weeks to a month before being placed in use. Or, the aging process may be expedited by annealing for a few minutes, say 50 to 15 minutes, at temperatures of about 800° to about 1,000° F.

Bodies prepared as above described are characterized by having relatively high dielectric constants (K) and desirably low electrical dissipation factors (D), at room temperature, as shown in the following table which includes values for bodies made of various proportions of sodium and cadmium columbates.

gen have relatively higher Curie temperatures than those fired in air, while, for others in the family, the reverse is true.

Figure 2 is a graph showing how the Curie point dielectric constant varies with composition of those materials of the present invention having from 10 to 25% by weight cadmium columbate, curve A being for air fired materials and curve B for oxygen fired materials. Curves C and D are included for purposes of comparison. These curves show how room temperature dielectric constant varies with composition in the case of both air fired materials (curve C) and oxygen fired (curve D). It will be noted that oxygen firing always produces materials having the highest dielectric constants.

One of the most desirable properties of the materials of the present invention, aside from their relatively high dielectric constants coupled with low electrical dissipation factor is that their dielectric constants remain fairly constant over broad temperature ranges. The degree of constancy varies somewhat with composition. For example, a material made up of 90% by weight sodium columbate and 10% by weight cadmium Table.—Binary $NaCbO_3 + (2CdO \cdot Cb_2O_5)$

| | Composition (Per Cent by Weight) | | Electrical Properties at Room Temperature | | | | |
|---|---|---|---|---|---|---|---|
| | | | | Fired in Air | | Fired in $O_2$ | |
| | $NaCbO_3$ | $2CdO.Cb_2O_5$ | Firing Temperature | K | D | K | D |
| 1 | 100 | 0 | 2,275° F | 303 | 0.05 | 325 | 0.03 |
| 2 | 95 | 5 | 2,200 air / 2,400 $O_2$ | 339 | 0.03 | 499 | 0.21 |
| 3 | 90 | 10 | 2,200 air / 2,300 $O_2$ | 759 | 0.062 | 976 | 0.17 |
| 4 | 85 | 15 | 2,200 air / 2,300 $O_2$ | 2,089 | 0.182 | 2,350 | 0.14 |
| 5 | 80 | 20 | 2,200 air / 2,300 $O_2$ | 2,109 | 0.27 | 2,121 | 0.21 |
| 6 | 75 | 25 | 2,300 air / 2,400 $O_2$ | 2,460 | 0.39 | 3,367 | 0.04 |
| 7 | 50 | 50 | 2,200° F. air | 1,210 | 0.16 | | |
| 8 | 25 | 75 | 2,200° F. air | 1,560 | 0.15 | | |
| 9 | 0 | 100 | 2,400° F. $O_2$ | 154 | 0.02 | 503 | 0.009 |

In general, the prepared ceramics of the present invention exhibit dielectric strengths of the order of 75 volts per mil. The series also exhibits ferroelectric, electrorestrictive, and piezoelectric properties. Because of the latter characteristic, they can be used as electromechanical transducers.

From the above table, it will be noted that, of the materials falling within the scope of the present invention, the body having the highest dielectric constant and, at the same time, very low electrical dissipation factor is one having the composition 75% by weight sodium columbate and 25% cadmium columbate. A body having this composition was found to pass through a Curie point near 290° C. where the dielectric constant was almost 8,500. In the case of a body having the composition, 85% sodium columbate and 15% cadmium columbate, by weight, the dielectric constant rises even higher from a room temperature value of about 2,300 to over 11,000 in the neighborhood of 240° C.

The Curie point temperatures of the materials of the present invention vary with the composition. Figure 1 includes plots of Curie temperature vs. percent cadmium columbate in materials comprising sodium and cadmium columbates, when air fired (curve A) and when fired in oxygen (curve B). It will be seen from these curves that some of these materials fired in oxycolumbate was found to have a very stable value of dielectric constant between room temperature and 150° C., whether air or oxygen fired. Dielectric constants of all of the materials rise rapidly as the Curie temperature is approached. The property of stability of dielectric constant with varying temperature makes this entire family of ceramics of particular value in applications where broad ranges of temperature are normally encountered.

In addition to the method of preparation described in the example, the sodium-cadmium columbate materials of the present invention may also be prepared by mixing sodium carbonate, cadmium oxide, and columbium oxide in the desired proportions, calcining to a unitary body, and then firing the calcine to vitrification temperature. Another alternative is to mix the necessary quantity of sodium carbonate, or other sodium compound readily decomposable to the oxide form, with compounds of cadmium and columbium which readily decompose in the presence of heat to yield the corresponding oxides, and heat to calcination temperature. The calcine is then compressed into a coherent body and fired to vitrification as described in the example.

The firing atmosphere may be either air or oxygen or any mixture of the two. Also, the materials of the present invention may be made by combining amounts of the sodium and cadmium columbates such that the product comprises from 99% by weight sodium columbate and 1% cadmium columbate to 1% sodium columbate and 99% cadmium columbate by weight. However, the preferred range for practical purposes is from 95% sodium columbate and 5% cadmium columbate by weight to 5% sodium columbate and 95% cadmium columbate.

Although only the preparation of sodium-cadmium columbate ceramics have been described in detail, any of the alkali metal columbates may be similarly combined with either zinc or cadmium columbate, in about the same proportions as indicated above, to produce vitreous ceramic materials having usefully high dielectric constants and relatively stable dielectric constants over broad temperature ranges.

I claim as my invention:

1. A vitreous ceramic body comprising a substantially homogeneous combination of an alkali metal columbate and another columbate from the class consisting of zinc and cadmium columbates.

2. A body according to claim 1 in which said alkali metal is sodium and said another columbate is cadmium columbate.

3. A body according to claim 2 in which said columbates are present in the range of from 95° sodium columbate–5% cadmium columbate to 5% sodium columbate–95% cadmium columbate, all percentages being by weight.

4. A body according to claim 3 comprising 75% sodium columbate and 25% cadmium columbate.

5. A body according to claim 1 in which said alkali metal is sodium and said another columbate is zinc columbate.

6. A solid dielectric material comprising a substantially homogeneous combination of an alkali metal columbate and another columbate from the class consisting of zinc and cadmium columbates.

7. A material according to claim 6 in which said alkali metal is sodium and said another columbate is cadmium columbate.

8. A vitreous ceramic body comprising a substantially homogeneous combination of an alkali metal oxide, columbium oxide, and an oxide from the class consisting of zinc oxide and cadmium oxide.

9. A solid dielectric material comprising a substantially homogeneous combination of an alkali metal oxide, columbium oxide, and an oxide from the class consisting of zinc oxide and cadmium oxide.

10. A method of preparing a ceramic dielectric body comprising separately preparing an alkali metal columbate and a columbate of a metal from the class consisting of zinc and cadmium, homogeneously mixing predetremined quantities of the two columbates, molding the mixture into a body, and firing the body to vitrification temperature.

11. A method according to claim 10 wherein the firing takes place in an oxygen atmosphere.

12. A method of preparing a ceramic dielectric body comprising mixing predetermined quantities of a calcined alkali metal columbate and a calcined columbate from the class consisting of zinc and cadmium columbates, forming the mixture into a body and firing the body to vitrification temperature.

13. A method according to claim 12 wherein the firing takes place in an oxygen atmosphere.

14. A method of preparing a ceramic dielectric body comprising mixing with columbium oxide predetermined proportions of an oxide from the class consisting of cadmium oxide and zinc oxide, and a compound thermally decomposable to yield an oxide of an alkali metal, calcining the mixture and firing the calcine to vitrification temperature.

15. A method according to claim 14 wherein all of said oxides are derived by calcining a mixture of compounds thermally decomposable to yield said oxides.

SAMUEL BOUSKY.

No references cited.